July 24, 1951  F. S. MILLER ET AL  2,561,670
IGNITOR
Filed July 30, 1945
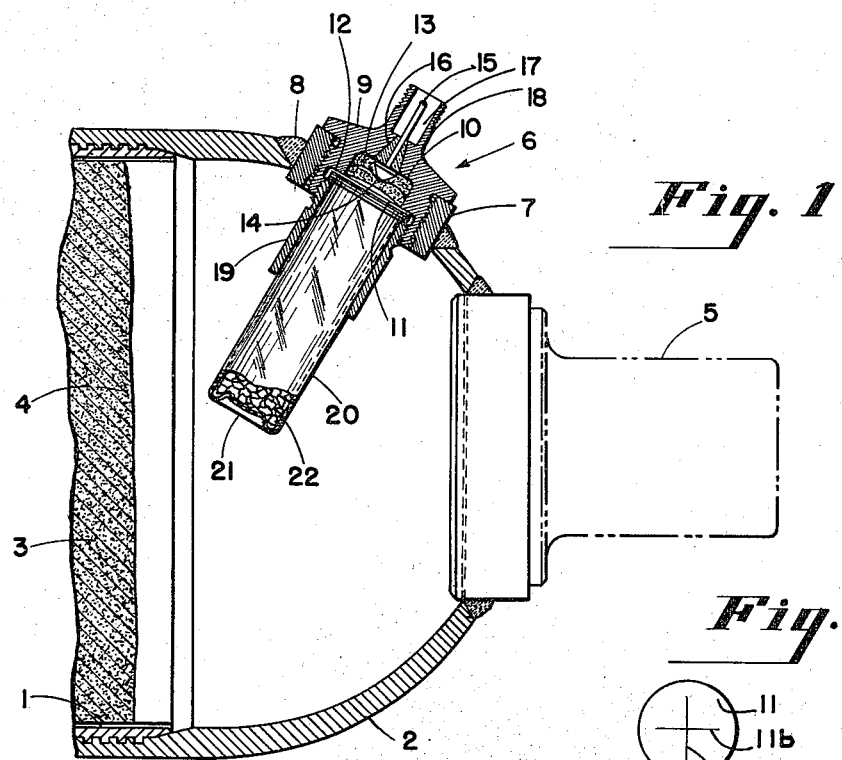
*Fig. 1*
*Fig. 1a*
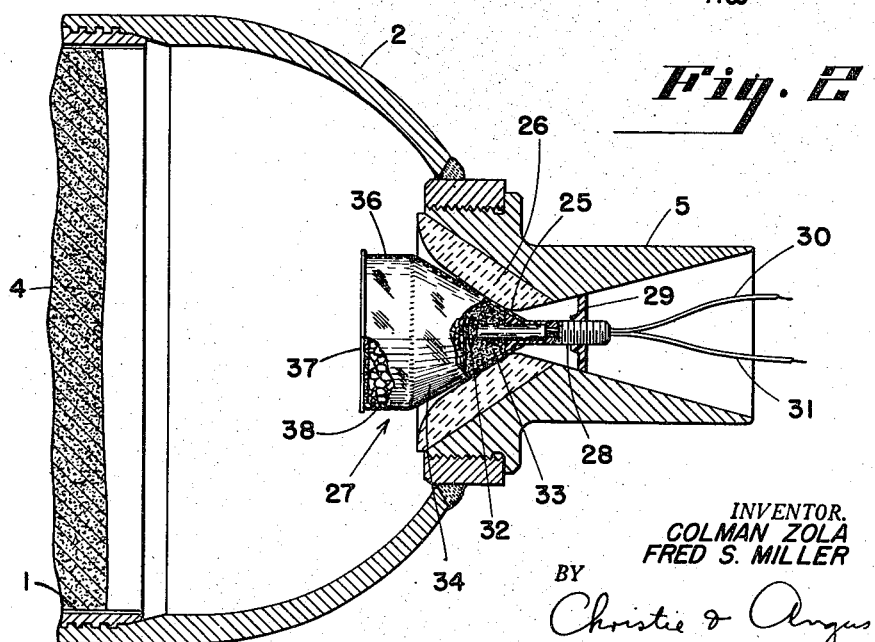
*Fig. 2*
INVENTOR.
COLMAN ZOLA
FRED S. MILLER
BY
Christie & Angus
ATTORNEYS Patented July 24, 1951

2,561,670

UNITED STATES PATENT OFFICE 2,561,670

IGNITOR

Fred S. Miller, Pasadena, Calif., and Colman Zola, Silver Spring, Md., assignors to Aerojet Engineering Corporation, Azusa, Calif., a corporation of Delaware Application July 30, 1945, Serial No. 607,688

3 Claims. (Cl. 102—86.5)

This invention relates to rocket motors and more particularly to means for igniting the propellant in the combustion chamber of the motor. The invention is a continuation-in-part of our co-pending application, Serial No. 521,550, filed February 8, 1944, now abandoned.

The principal object is to provide an effective and reliable ignition device for a rocket motor.

Jet propelled devices such as rocket motors ordinarily comprise a combustion chamber, a charge of fuel within the chamber, and an exhaust nozzle through which the gases resulting from the combustion pass at high velocity to create the propulsive thrust. Provision is commonly made for igniting the charge in the chamber, and this may be a flame directed against the charge.

According to our invention we provide an improved ignition means capable of bringing a large hot flame against the surface of the propellant charge in the chamber. We carry out our invention by the provision of a cartridge containing relatively small pieces or pellets of inflammable ignition material; and we make the cartridge enclosing them of an inflammable material so that the cartridge will not explode, but will readily burn and send a large spray of flame from the burning pellets or particles over the exposed propellant surface. The inflammable pellets within the cartridge may be ignited by a suitable igniting charge which may for example be a black powder ignited by suitable ignition means.

The foregoing and other features of our invention will be better understood from the following detailed description taken in conjunction with the accompanying drawings of which:

Fig. 1 is a view mostly in cross section showing the nozzle end of a rocket motor with an ignitor according to our invention;

Fig. 1a is a view of the frangible disc; and

Fig. 2 is a view mostly in cross section showing the nozzle end of a rocket motor with an ignitor charge according to our invention adapted to fit into the nozzle opening.

Referring to Fig. 1, there is shown the nozzle end of a rocket or jet motor comprising a combustion chamber 1, ordinarily of metal, which may be cylindrical in shape and closed at the end which is not shown in the drawing. At the open end of the cylindrical chamber there is screwed a cap 2 which may be generally hemispherically shaped. The chamber of the motor is filled with a solid or semisolid type of propellant composition 3 which may for example contain asphalt with potassium perchlorate mixed in it as an oxidizer. In accordance with good practice, the surface 4 of the propellant is made flat as shown. At the outer end of the cap there is attached a suitable exhaust nozzle 5 which is preferably of the De Laval type having a Venturi shaped opening through which gases from the combustion of the propellant in the chamber pass at high velocity.

An ignitor 6 is provided extending through the cap to ignite the propellant charge; and the ignitor shown is constructed according to our invention. To fit the ignitor to the cap there is provided a suitable boss 7 which may be secured to the cap by welding 8 as shown and provided with a set of internal threads to receive a plug member 9 of the ignitor. There is centrally formed within the plug member 9 a recess 10 closed by a frangible disc 11 such as cardboard or the like placed against an internal shoulder 12 of the plug. The disc 11 is preferably weakened somewhat, as shown in Fig. 1a, by weakening grooves 11a and 11b. This allows the disc 11 readily to burst open. There is placed across this recess a suitable ignition wire 13 of the type adapted to become very hot when an electric current passes through it, the ends of this wire being soldered or welded to the internal surface of the plug. The central portion of the wire is soldered or welded to a terminal member 14 attached to an electrical conducting stem or lead 15 passing from the terminal through an insulating bushing 16 to a recess 17 formed in an outer stem 18 of the plug member 9. The recessed end is filled with a suitable ignition charge such as a black powder which readily ignites when current is passed through both halves of wire 13 by connecting an electrical voltage source to stem 15 and the threads of collar 18.

The inner flange of plug 9 is threaded to receive the end of a sleeve 19 which may be of a suitable metal. There is snugly fitted within the sleeve a tubular cartridge 20 closed at its outer end 21 and filled with pellets or particles 22 of an inflammable material, which may for example be broken up pieces of the same sort of composition from which the propellant 3 is made, or may be phenyl formaldehyde-perchlorate mixtures or blasting powder in grains. The cartridge itself is made of an inflammable material such as cellulose nitrate which readily burns and releases the pellets.

When the ignitor is ignited by closing the electric circuit through terminals 15 and 18, the Nichrome wire is heated, igniting the powder in recess 10. The powder readily burns through the frangible disc 11 and ignites pellets or particles 22 in the cartridge. The cartridge material 20 likewise ignites and the burning pellets are spread over the surface 4 of the propellant composition thereby providing effective ignition.

The provision of the sleeve 19 around the cartridge serves to retain the cartridge in position so that it will not readily be blown en masse away from its position at the ignitor.

Fig. 2 shows a modification in which an ignitor is placed in the exhaust nozzle of the motor. The nozzle 5 is shown in cross section and flares to larger cross sectional areas both within and without the most constricted throat portion 25. The nozzle material may be metal such as steel, but preferably there is placed a refractory element 26 in the nozzle at the throat.

The ignitor 27 comprises a stud 28 threaded at its outer end to have threaded thereon a suitable disc or washer 29. The stud is hollow so that a pair of wires 30 and 31 can pass through it and out through the opening at the inner end to connect with the Nichrome wire 32 as shown. This Nichrome wire is embedded in black powder 33 which fills the apex end of the conical member 34. A suitable disc or diaphragm 35 serves to hold the powder in place. The inner end of the conical member is brought to a cylindrical portion 36 as shown and is closed at its outer end by a suitable covering such as a mesh or gauze 37. The conical member 34 and 36 is made of an inflammable substance such as cellulose acetate and the portion of it between diaphragm 35 and the end 37 is filled with the inflammable pellets or pieces 38.

The shape of the conical member is such that it fits within the throat of the nozzle as shown and is held in position by washer 29. To enable the ignitor to be installed it may be inserted in position as shown before the cap 2 is applied to the combustion chamber and then the washer 29 is screwed onto the stud.

In operation, the closing of the circuit wires 30 and 31 across a source of potential ignites the black powder which fires the inflammable pellets, throwing the flame from them against the propellant surface 4. The conical member burns and the rest of the ignitor comprising the stud 28 and washer 29 are blown out by the force of the blast.

It will be recognized that according to our invention we have provided an efficient ignitor comprising a container which burns as well as the ignition material, providing an effective amount of flame thrown over a wide area of the surface of the propellant and insuring the ignition thereof.

We claim:

1. An ignitor comprising a metallic head having an internal recess, a metallic sleeve fitted within the recess and protruding therefrom, a cylindrical cartridge fitted within the sleeve, said cartridge having an inflammable envelope and containing inflammable particles, a frangible diaphragm at the end of the cartridge which is inserted within the sleeve and separating the internal portion of the cartridge from the recess, an inflammable powder within the recess, and means for igniting the inflammable powder.

2. An ignitor comprising a head having an internal recess, a sleeve fitted within the recess and protruding therefrom, a cylindrical cartridge fitted within the sleeve and having an end protruding from the sleeve, said cartridge having an inflammable envelope and containing inflammable particles, a frangible diaphragm at the end of the cartridge which is inserted within the sleeve and separating the cartridge from the recess, an inflammable powder within the recess, and means for igniting the pwoder.

3. An ignitor according to claim 2 in which the sleeve is threaded into the recess and the end of the sleeve which is within the recess holds the diaphragm against a shoulder of the head.

FRED S. MILLER.
COLMAN ZOLA.

REFERENCES CITED

The following references are of record in the file of this patent:

UNITED STATES PATENTS

| Number | Name | Date |
|---|---|---|
| 455,278 | Cunningham | June 30, 1891 |
| 1,791,049 | White | Feb. 3, 1931 |
| 1,933,694 | Allen | Nov. 7, 1933 |
| 2,289,318 | Pratt | July 7, 1942 |
| 2,398,683 | Whitworth | Apr. 16, 1946 |

FOREIGN PATENTS

| Number | Country | Date |
|---|---|---|
| 2,554 | Great Britain | July 3, 1877 |
| 14,000 | Great Britain | June 24, 1896 |